United States Patent Office 2,700,997
Patented Feb. 1, 1955

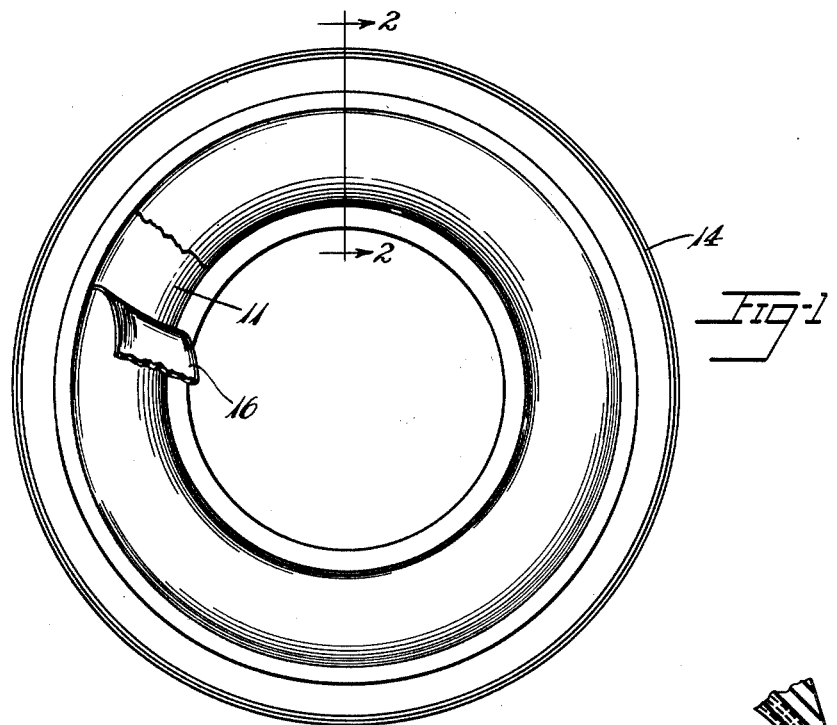
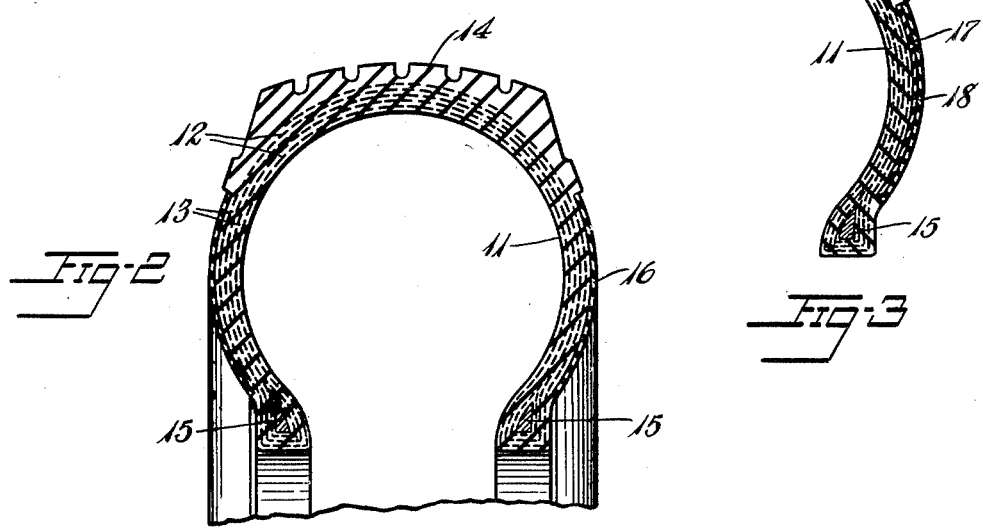
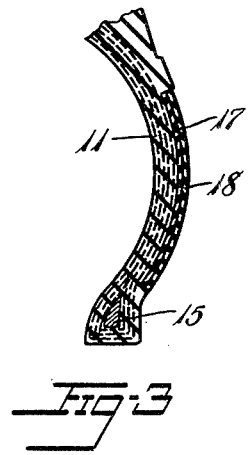

2,700,997

TIRE CONSTRUCTION

Richard T. Morrissey and Henry J. Weiss, Cuyahoga Falls, Ohio, assignors to The B. F. Goodrich Company, New York, N. Y., a corporation of New York Application June 30, 1951, Serial No. 234,545

9 Claims. (Cl. 152—330)

This invention relates to laminated structures such as those used in tire constructions and particularly to white sidewall tires or other laminated structures having a light-colored outer rubber layer adjacent and adhered to other rubber layers. The invention has particular reference to improved constructions for white sidewall tires, which constructions are designed to eliminate the passage of migrating staining materials into the light-colored layers of the white sidewall from adjacent rubber layers, and to provide white sidewalls with high resistance to discoloration and oxidation.

Many attempts have previously been made to prevent staining of the light-colored layers in a laminated rubber structure such as a white sidewall construction in a tire casing. The problem has arisen because it is desirable many times to incorporate staining material in the rubber compositions used for some of the layers in a laminated rubber construction to obtain processing and quality characteristics favorable to that construction. If the staining materials are not intentionally added, it has been found staining of the light-colored layers still results for reasons which have not been determined fully. There has been much work done to improve the resistance of white sidewalls to oxidation and weathering due to sunlight and ozone.

In the past, barrier layers containing inhibitors of migration have been interposed between the light-colored layer and other rubber layers of a laminated composite structure.

Likewise, various other means have been suggested and employed to solve the staining problem including the use of certain non-staining rubber compositions in the sidewall. However, the search for still better materials has continued.

It is an object of this invention to provide a light-colored rubber composition which will not be stained by migratory staining materials from adjacent rubber layers with which the light-colored rubber is laminated.

It is also an object to provide a non-staining white sidewall for a tire casing.

It is an object to provide a light-colored rubbery composition which may be blended with crude rubber and then vulcanized in the conventional manner, using relatively short curing cycles.

It is an object to provide a laminated rubbery construction having as one component a light-colored, non-staining rubber layer.

It is a further object to provide a white sidewall composition suitable for tires which can be readily adhered to other vulcanizable rubbery materials including crude rubber.

It is an object to provide a white sidewall composition which resists oxidation due to weathering effects of sunlight and ozone.

Other objects will be apparent from the following description and drawing.

It has been discovered that non-staining, light-colored rubbery layers, having greatly improved properties including unusual resistance to oxidation can be made from novel materials of the class characterized as bromine-containing derivatives of isoolefin-polyolefin interpolymers and particularly from rubbery materials of this class. Blends of such brominated interpolymers with crude rubber or any of the various known synthetic rubbers have also been found particularly suitable as non-staining, light-colored rubber compositions. Such interpolymers have been prepared by the introduction of bromine atoms into the polymer structure of the isoolefin-polyolefin interpolymer.

The preferred isoolefin-polyolefin interpolymer comprises a major proportion of an isoolefin such as isobutylene and a minor proportion of one or more polyolefins (i. e., diolefins, triolefins, or other olefins containing more than one double bond), which interpolymers are characterized by high molecular weight, low unsaturation and low reactivity with sulfur to give an elastic product. These interpolymers are described in U. S. Patents 2,322,073; 2,356,128; 2,356,129; 2,356,130; 2,373,706; 2,384,975 and 2,418,912. The most common interpolymers of this type are copolymers of a major proportion of isobutylene and a minor proportion of isoprene which are known as "Butyl" or GR–I–50, GR–I–15, GR–I–17, and GR–I–18. The isoolefin-polyolefin interpolymers used in preparing brominated derivatives are the solid plastic rubbery interpolymers described in the above-listed patents. Examples are the interpolymers of a major proportion, desirably from 70 to 99% by weight, of an isoolefin containing from 4 to 8 carbon atoms such as isobutylene, 3-methyl butene-1, 4-methyl pentene-1, 2-ethyl butene-1, 4-ethyl pentene-1, or the like, or a mixture of such isoolefins, with a minor proportion, desirably from 1 to 30% by weight, of a polyolefin generally containing from 4 to 18 carbon atoms, or two, three, or more such polyolefins including the following:

(1) Acyclic or open-chain conjugated diolefins such as butadiene-1,3; isoprene; 2,4-dimethyl butadiene-1,3; piperylene; 3-methyl pentadiene-1,3; hexadiene-2,4; 2-neopentyl-butadinene-1,3, and the like;

(2) Acyclic non-conjugated diolefins such as dimethallyl and its homologs containing 2 to 6 carbon atoms interposed between two isopropenyl radicals; 2-methyl hexadiene-1,5; 2-methyl pentadiene-1,4; 2-methyl heptadiene-1,6; 2-methyl heptadiene-1,4, and other tertiary non-conjugated diolefins having one double bond in the terminal position attached to a tertiary carbon atom;

(3) Alicyclic diolefins, both conjugated and non-conjugated, such as cyclopentadiene; cyclohexadiene; 1-vinyl cyclohexene-3; 1-vinyl cyclohexene-1; 1-vinyl cyclopentene-1; 1-vinyl cyclobutene-2; dicyclopentadiene, and the like, as well as monocyclic diolefinic terpenes such as dipentene, terpinenes, terpinolene, phellandrenes, sylvestrene, and the like;

(4) Acyclic triolefins such as 2,6-dimethyl-4-methylene-heptadiene-2,5; 2-methyl hexatriene-1,3,5 and other conjugated triolefins; as well as myrcene, ocimene, allo-ocimene and the like;

(5) Alicyclic triolefins such as fulvene (5-methylene-cyclopentadiene); 6,6-dimethyl fulvene; 6,6-methyl ethyl fulvene; 6-ethyl fulvene; 6,6-diphenyl fulvene; 6-phenyl fulvene and other fulvenes of the formula $$\begin{array}{c} HC\!\!-\!\!-\!\!-\!\!CH \\ \| \quad\quad \| \\ HC \quad\quad CH \\ \diagdown\!C\!\diagup \\ \| \\ R\!-\!C\!-\!R \end{array}$$

wherein each R is hydrogen, alkyl, cycloalkyl or aryl; as well as other alicyclic triolefins such as 1,3,3-trimethyl-6-vinyl-cyclohexadiene-2,4; cycloheptatriene, etc.; and (6) Higher polyolefins such as 6,6-vinyl methyl fulvene (a tetraolefin), and 6,6-diisopropenyl fulvene (a pentaolefin).

The preferred solid, plastic, rubbery interpolymers are generally prepared by low temperature (from 0° C. to −165° C.) interpolymerization using an appropriate catalyst such as an active metal halide or Friedel-Crafts type catalyst (aluminum chloride or boron trifluoride) dissolved in a low freezing solvent such as methyl or ethyl chloride. These interpolymers generally have an average molecular weight above 15,000, iodine numbers of from 0.5 to 50, and they are reactive with sulfur to form elastic products.

Isoolefin-polyolefin interpolymers containing other additional monomers such as styrene, chlorostyrenes, acrylyl chloride, methallyl chloride, and other monolefinic monomers may also be used instead of a true copolymer of isoolefin and polyolefin alone. An interpolymer produced from a monomer system comprising 50% isobutylene, 30% styrene and 20% isoprene may be used.

The bromination of such interpolymers may be carried out by any suitable process which gives a product having from as little as 0.5% by weight to as much as 50% by weight of combined bromine depending upon the degree of unsaturation present in the original interpolymer, which in turn depends upon the proportion of polyolefin in the interpolymer used. Preferably the derivatives are not completely saturated; the percentage of combined bromine being from 20 to 80% of the amount which would be present if all olefinic double bonds were completely brominated. The preferred range of combined bromine is from 1 to 8% by weight in interpolymers containing from 95 to 98% isoolefin or 2 to 5% diolefin.

Some of the methods which may be used are: (1) passing gaseous bromine over finely-divided solid isoolefin-polyolefin interpolymer; (2) adding a solid brominating agent such as N-bromosuccinimide to the interpolymer on a mixing mill, or (3) preparing a solution, dispersion or cement of the interpolymer in a suitable liquid organic solvent and adding the brominating agent either as such or in solution to the interpolymer solution to form the brominated interpolymer in solution or dispersion in the solvent, which final solution is admixed with a non-solvent for the brominated derivative to precipitate the latter.

In building a laminated structure of a light-colored rubber layer and normally staining rubber layers adjacent thereto, the light-colored rubber layers of this invention are used advantageously for the following reasons:

1. They have excellent non-staining and non-discoloring properties.
2. They adhere to crude or synthetic rubber.
3. When compounded properly they have very superior ozone resistance.
4. They have good flex properties.
5. They have good heat-resistance and aging properties.
6. They can be vulcanized under the same conditions of heat and temperature as are the adjacent layers of rubber (conventional compositions) containing the staining materials.
7. They may be vulcanized much more rapidly than layers of unbrominated isoolefin-polyolefin interpolymers and the vulcanization may be accomplished without the aid of sulfur, if need be, by adding vulcanizing agents such as the bivalent metal oxides (zinc oxide, etc.)

Likewise, the brominated interpolymers are used to advantage when laminating white sidewall compositions with a non-staining rubber carcass for these brominated interpolymer white sidewall compositions have superior ozone resistance, are readily adhered to the carcass compositions, and resist oxidation by weathering due to sunlight, etc. For this reason the compositions of this invention are used regardless of whether the carcass of the tire contains staining ingredients.

The brominated interpolymers may be used alone or may be blended with one or more compatible rubbers such as crude or one of the synthetic rubbers. A straight brominated isobutylene-isoprene interpolymer composition containing no other rubbery ingredients may be adhered to other rubbers and has the other numerous advantages listed above. However, it has been found preferable to blend the brominated interpolymer with such a rubber as crude rubber in order to improve the processing characteristics of the resulting composition. For instance, when laminating several layers of rubber together, it is desirable to have tacky surfaces which tend to adhere one to the other when clean even without the use of adhesives. Such a property in a rubber composition is generally referred to as "building tack." It has been found that by adding some crude rubber to the brominated interpolymer composition the "building tack" is improved greatly.

The invention may be embodied in any laminated article and is particularly suitable for tire casing constructions having a carcass containing migratory staining materials and white sidewall portions adjacent thereto.

For purposes of illustration, the invention will be exemplified in detail with reference to a tire casing.

In the drawings,

Fig. 1 is a view in elevation of a tire casing with a portion of the white sidewall stripped back for clarity.

Fig. 2 is a fragmentary sectional view along line 2—2 of Fig. 1, and

Fig. 3 shows another embodiment of the invention.

The tire construction includes a carcass 11 of fabric plies 12 and rubber plies 13, a tread portion 14, bead wires 15, and white sidewall portion 16.

The carcass 11 comprises rubber plies 13, 13 which may be a vulcanized composition of a blend of crude rubber with butadiene-styrene synthetic rubber or other suitable synthetic rubbers or reclaimed rubber, or crude rubber or synthetic rubber alone, the composition containing migratory staining materials such as the common antioxidants, or some of the common accelerators, softeners, oils and other compounding ingredients. Such staining materials would normally migrate into the sidewall portion 16 from the rubber plies 13 lying adjacent thereto.

The white sidewall portion 16 is of the normal thickness used for such purposes, i. e., from 0.040 to 0.500″ and preferably from 0.100″ to 0.150″.

The sidewall portions of this invention comprise a vulcanized composition which retards migration of the staining materials and which is itself non-staining. The vulcanized compositions which may be used comprise a brominated rubbery interpolymer of from 70 to 99% by weight of an isoolefin containing from 4 to 8 carbon atoms with from 1 to 30% by weight of a polyolefin containing from 4 to 18 carbon atoms together with a rubber compatible with the brominated interpolymer. The rubber compatible with these brominated interpolymers may be crude rubber and when crude is used the additions of crude rubber may be such as to give ratios of brominated interpolymer to crude from 90:15 to 40–60. Thus, the crude rubber is added in amounts equal to ⅙ to 1½ times the weight of the brominated interpolymer. The brominated interpolymer, if used alone, provides adequate resistance to stain migration and may be adhered to other rubbery compositions including crude and synthetic rubber, but it has been found some compatible rubber such as crude is preferably added to the brominated interpolymer to give improved processing characteristics and to provide good build tack. The compatible rubber added need not be impervious to migrating staining materials for if the brominated interpolymer is present with the range of proportions shown above, the staining materials will be effectively retarded.

The compatible rubbers which may be blended with the brominated interpolymers include crude rubber and such synthetic rubbers as the butadiene-styrene copolymers and butadiene-acrylonitrile copolymers; likewise rubbery polymers of a chlorobutadiene-1,3, may be used. The sidewall composition may contain the common compounding ingredients such as vulcanizing agents, accelerators, softeners, fillers, etc. in addition to the rubbery components.

The tread portion 14 may be prepared according to any of the conventional compounding recipes.

A tire embodying the invention is built in the conventional manner and vulcanized into a unitary structure by the usual methods, such as heating in a mold.

In building this tire, the carcass and sidewall compositions are prepared as follows:

The rubbery material for the white sidewall composition is prepared by dissolving a high molecular weight, solid, plastic interpolymer of about 97% isobutylene and 3% isoprene in liquid ethyl chloride to form a 20% solution containing 100 parts of interpolymer. Bromine is dissolved in ethyl chloride to form a 10% solution containing 6 parts of bromine and this solution is added to the interpolymer solution at 0° C. in a closed vessel and the resulting mixture is stirred for five minutes. An excess of a saturated solution (30%) of potassium hydroxide in ethyl alcohol is then added to neutralize all the unreacted bromine. After further stirring for thirty minutes, two parts of a stabilizer, such as "Paraplex G-60" (Rohm and Haas), which is believed to be a condensation product of phthalic anhydride and glycerol containing some modifying agent such as a fatty acid, is added and the stirring is continued for fifteen minutes. The reaction mixture is transferred to a closed coagulation tank containing water at from 60° to 70° C. and a detackifying agent to prevent agglomeration such as a fatty acid soap, emulsifier, etc. (about 2 parts of zinc stearate may be used). The ethyl chloride is flashed off and recovered by suitable means and the brominated interpolymer remains in the form of rubbery crumbs dispersed in the aqueous medium. These crumbs are separated from the water by filtering or any other suitable manner and the crumbs used to form a sheet of the product on a conventional rubber mill.

The brominated isobutylene-isoprene interpolymer obtained has a bromine content of from 2 to 3% by weight. This plastic, easily worked rubbery interpolymer is then mixed with crude rubber in sufficient amounts to obtain a 60:40 ratio of brominated derivative to crude rubber. The resulting rubbery material is used as follows. A typical recipe for a sidewall composition will be described but the invention is not to be limited thereto.

White sidewall composition

| Material: | Parts by weight |
|---|---|
| Rubbery material | 100.0 |
| Calcium silicate | 6.0 |
| Zinc oxide | 87.0 |
| Titanium dioxide | 14.0 |
| Ultramarineblue | 0.2 |
| Mercaptobenzothiazole | 0.75 |
| Diortho tolyl guanidine | 0.1 |
| Sulfur | 2.0 |
| Total | 210.5 |

The rubbery material and compounding ingredients are mixed on a mill or an internal mixer in the conventional manner.

The carcass composition is prepared according to the following recipe:

Carcass composition

| Material: | Parts by weight |
|---|---|
| Crude rubber | 45.0 |
| Butadiene-styrene rubber (75:25) | 40.0 |
| Reclaim (whole tire) | 35.0 |
| Mineral oil | 5.0 |
| Pine tar | 2.0 |
| Heptylated diphenyl amine | 1.0 |
| Zinc oxide | 4.0 |
| Carbon black | 30.0 |
| Sulfur | 3.0 |
| Benzothiazyl disulfide | 0.8 |
| Total | 165.8 |

The carcass composition is calendered on cord fabric which may be cotton, nylon, rayon, etc., and then this rubber-frictioned cord fabric is laid ply-on-ply to form a plied carcass construction. The number of plies used depends upon the size and service requirements of the tire. The white sidewall composition is formed into proper shaped strips by extrusion or other suitable means and these strips are adhered directly to the carcass. A conventional rubber tread portion is provided by mixing the rubber and other ingredients in the usual manner, extruding the composition into the proper configuration and applying the tread portion about the crown of the carcass, the tread portion extending downwardly over the shoulders of the carcass.

The assembled tire is vulcanized in a mold at 305° F. for about 30 minutes. The resulting tire has unusual properties. The white sidewall remains unstained from the usual migrating materials in the carcass composition. The non-staining white-sidewall composition remains tightly adhered directly to the carcass throughout the life of the tire even though heretofore the adhesion of isobutylene-isoprene interpolymers to crude and most synthetic rubbers has been very difficult to achieve.

Furthermore, the white sidewall portion is fully vulcanized during the relatively short curing period used for the rubbery constituents of the rest of the tire while unbrominated isobutylene-isoprene interpolymers normally require a much longer curing period. The abrasion resistance and resistance to discoloration of the sidewall are good.

Another laminated construction which can be used to advantage in building white sidewall tires is shown in Fig. 3. Here a barrier sheet 17 of the brominated derivative which is prepared according to the recipe for a white sidewall composition above is interposed and adhered between the carcass 11 and the white sidewall sheet 18 as shown. This barrier sheet 17 is from 0.030" to 0.080" or up to as much as 0.1" in thickness and the white sidewall sheet 18 is of such thickness as to bring the total thickness of the two up to from 0.10" to 0.15". The white sidewall sheet 18 is prepared according to any conventional white sidewall recipe, and may contain crude rubber, rubbery butadiene-styrene copolymer, rubbery polychloroprene, or any other rubber commonly used for this purpose. When a tire incorporating such a sidewall construction is vulcanized in a heated mold, the white sidewall layer, brominated isobutylene-isoprene interpolymer layer and carcass are tightly adhered one to the other. Staining materials in the carcass are successfully retarded from passing to the white sidewall layer by the barrier sheet as long as the thickness thereof is at least 0.030" thick when a 60:40 blend of brominated isobutylene-isoprene interpolymer and crude rubber is used. When blends having lower proportions of brominated derivatives are used, it may be necessary to increase the thickness of the barrier sheet slightly.

Any other laminated rubber or rubber and fabric article or construction having a light-colored rubber composition in contact with a layer of a rubber composition containing migratory staining materials, such as hose or belts, may embody this invention.

The invention is not to be limited to the example, a tire casing, rather the invention is intended to include any laminated structure within the spirit and scope of the appended claims.

We claim:

1. A laminated structure comprising a light-colored vulcanized layer comprising a brominated derivative of a rubbery interpolymer of from 70 to 99% by weight of an isoolefin containing from 4 to 8 carbon atoms with from 1 to 30% by weight of a polyolefinic hydrocarbon containing from 4 to 18 carbon atoms and a rubber compatible with said rubbery interpolymer present in an amount equal to from ⅛ to 1½ times the weight of said rubbery interpolymer, said derivative being such a rubbery interpolymer brominated to an extent such that it contains combined bromine in an amount sufficient to saturate from 20 to 80% of the olefinic double bonds of said rubber interpolymer, and a vulcanized layer of a rubber composition containing migratory staining material, said light-colored layer being in adhering face-to-face contact with said layer containing migratory staining material.

2. A laminated structure comprising a light-colored vulcanized layer comprising a brominated derivative of a rubbery interpolymer of from 70 to 99% by weight of isobutylene with from 1 to 30% by weight of isoprene and crude rubber present in an amount equal to from ⅛ to 1½ times the weight of said rubbery interpolymer, said derivative being such an interpolymer brominated to an extent such that it contains combined bromine in an amount sufficient to saturate from 20 to 80% of the olefinic double bonds of said rubbery interpolymer, and a vulcanized layer of a rubber composition containing migratory staining material, said light-colored layer being in adhering face-to-face contact with said layer containing migratory staining material.

3. A vulcanized tire casing comprising a light-colored sidewall portion in contact with a carcass comprising a rubber containing migratory staining material, said light-colored sidewall portion comprising a rubbery interpolymer of from 70 to 99% by weight of an isoolefin containing from 4 to 8 carbon atoms with from 1 to 30% by weight of a polyolefin containing from 4 to 18 carbon atoms, said rubbery interpolymer being brominated to such an extent that it contains combined bromine in an amount sufficient to saturate from 20 to 80% of the olefinic double bonds of said rubbery interpolymer, and a rubber compatible with said rubbery interpolymer present in an amount equal to from ⅛ to 1½ times the weight of said rubbery interpolymer, said sidewall portion being adhered to said carcass.

4. A vulcanized tire casing comprising a light-colored sidewall portion in adherent contact with a carcass comprising a rubber containing migratory staining material, said light-colored sidewall portion comprising a rubbery interpolymer of from 70 to 99% by weight of isobutylene and from 1 to 30% by weight of isoprene and crude rubber present in an amount equal to from ⅛ to 1½ times the weight of said rubbery interpolymer, said rubbery interpolymer having from 1 to 8% by weight of combined bromine.

5. A laminated structure comprising a light-colored layer comprising a brominated rubbery interpolymer of from 70 to 99% by weight of an isoolefin containing from 4 to 8 carbon atoms with from 1 to 30% by weight of a polyolefin containing from 4 to 18 carbon atoms, said rubbery interpolymer being brominated to such an extent that it contains combined bromine in an amount sufficient to saturate from 20 to 80% of the olefinic double bonds of said rubbery interpolymer, and a layer of rubbery material disposed adjacent to said light-colored layer and in contact therewith comprising a rubber composition containing migratory staining material.

6. A laminated structure comprising a light-colored layer comprising a brominated rubbery interpolymer of from 70 to 99% by weight of an isoolefin containing from 4 to 8 carbon atoms with from 1 to 30% by weight of a polyolefin containing from 4 to 18 carbon atoms and a rubber compatible with said brominated rubbery interpolymer, said rubbery interpolymer being brominated to such an extent that it contains combined bromine in an amount sufficient to saturate from 20 to 80% of the olefinic double bonds of said rubbery interpolymer, and a layer of rubbery material disposed adjacent to said light-colored layer and in contact therewith comprising a rubber composition containing migratory staining material.

7. A laminated structure comprising a vulcanized layer of rubber composition containing migratory staining material, a vulcanized layer comprising a brominated rubbery interpolymer of from 70 to 99% by weight of an isoolefin containing from 4 to 8 carbon atoms with from 1 to 30% by weight of a polyolefin containing from 4 to 18 carbon atoms, said rubbery interpolymer being brominated to such an extent that it contains combined bromine in an amount sufficient to saturate from 20 to 80% of the olefinic double bonds of said rubbery interpolymer, and a light-colored vulcanized layer of a rubbery composition permeable to migrating staining material, said vulcanized layer containing said brominated rubbery interpolymer being disposed between the other two said vulcanized layers, said layers being in adherent face-to-face contact.

8. A vulcanized tire casing comprising a carcass containing migratory staining material, a white sidewall portion comprising a rubber composition subject to migratory staining material, and a layer of a rubbery material comprising crude rubber and a brominated rubbery interpolymer comprising from 70 to 99% by weight of isobutylene with from 1 to 30% by weight of isoprene, said rubbery interpolymer being brominated to such an extent that it contains combined bromine in an amount sufficient to saturate from 20 to 80% of the olefinic double bonds of said rubbery interpolymer, said crude rubber being present in an amount equal to from ⅛ to 1½ times the weight of said brominated rubbery interpolymer, said layer comprising brominated rubbery interpolymer and crude rubber being interposed between said carcass and said white sidewall portion and in adhering contact therewith.

9. A tire casing comprising a carcass containing migratory staining material and a layer disposed adjacent to said carcass and in contact therewith comprising a brominated rubbery interpolymer of from 70 to 99% by weight of an isoolefin containing from 4 to 8 carbon atoms with from 1 to 30% by weight of a polyolefin containing from 4 to 18 carbon atoms, said rubbery interpolymer being brominated to such an extent that it contains combined bromine in an amount sufficient to saturate from 20 to 80% of the olefinic double bonds of said rubbery interpolymer.

References Cited in the file of this patent

UNITED STATES PATENTS

| | | |
|---|---|---|
| 2,170,947 | Habgood et el. | Aug. 29, 1939 |
| 2,403,200 | Weiss | July 2, 1946 |
| 2,418,025 | Garvey | Mar. 25, 1947 |
| 2,566,328 | Hessney et al. | Sept. 4, 1951 |
| 2,566,329 | Hessney et al. II | Sept. 4, 1951 |
| 2,631,984 | Crawford et al. | Mar. 17, 1953 |